United States Patent [19]

Lonsinger et al.

[11] Patent Number: 5,013,698
[45] Date of Patent: May 7, 1991

[54] METHOD OF REDUCING CARBON LOSS IN REGENERATION PROCESS

[76] Inventors: Jack J. Lonsinger; Deborah A. Lonsinger, both of 508 Clayview Dr., Liberty, Mo. 64068

[21] Appl. No.: 457,395

[22] Filed: Dec. 27, 1989

[51] Int. Cl.$^5$ .................... B01J 20/34; B01J 38/60; C02F 1/42
[52] U.S. Cl. .................................. 502/27; 210/687; 502/55
[58] Field of Search ............. 502/27, 28, 25, 22, 502/55; 423/460, 461; 210/687, 792, 794

[56] References Cited

U.S. PATENT DOCUMENTS

| | | | |
|---|---|---|---|
| 1,507,521 | 9/1924 | Russell | 502/55 |
| 1,533,031 | 4/1925 | Saver | 502/27 |
| 1,771,719 | 7/1930 | Meyer | 502/55 |
| 3,965,037 | 6/1976 | Kennedy | 502/27 |
| 4,416,798 | 11/1983 | Hager et al. | 502/55 |

FOREIGN PATENT DOCUMENTS 1189498  11/1985  U.S.S.R. ................ 502/27

*Primary Examiner*—Paul E. Konopka
*Attorney, Agent, or Firm*—Kokjer, Kircher, Bradley, Wharton, Bowman & Johnson

[57] ABSTRACT

A method of reducing alkaline earth metals contamination of activated carbon by washing the contaminated product with an inorganic acid, preferably hydrochloric, and then rinsing the acid washed carbon with water. Preferably, the washing step is carried out from three to thirty minutes at a pH of 2.5 or less. The rinsing step is continued until a pH of 5 or greater is obtained, preferably for a time period of at least three to five minutes. The method is applicable to any alkaline earth metal but particularly calcium and magnesium. Any inorganic may be employed with those forming water soluble salts being preferred. The invention also encompasses a method of regenerating spent activated carbon employing the acid wash and rinsing steps noted above followed by separating the washed carbon from the rinse water followed by drying and then pyrolizing the dried carbon at a temperature of approximately 500 degrees C. to 1100 degrees C. so as to effect the water gas reaction. The regenerated carbon is then removed from the processing stream.

5 Claims, No Drawings

METHOD OF REDUCING CARBON LOSS IN REGENERATION PROCESS

This invention relates generally to activated carbon, and more particularly, to a method for improving the carbon yield during regeneration by removing contaminants, such as calcium, magnesium and other alkaline earth metals.

Activated carbon is widely utilized as a material for absorbing gases, liquids and solids. Procedures for producing activated carbon are well known and one example of such a procedure is given in U.S. Pat. No. 4,107,084, issued Aug. 15, 1978. Activated carbon is typically produced by destructive distillation at high temperatures. One application of activated carbon is for water purification.

There are also known procedures for regenerating (reactivating) spent activated carbon. A typical process involves removal of excess water, pyrolyzing the dried carbon product to produce volatiles and fixed carbon, the latter being removed by chemical reaction. Most regeneration processes take advantage of the well known water gas reaction where carbon combines with water at high temperatures to produce carbon monoxide and hydrogen. A typical regeneration process for activated carbon is set forth in U.S. Pat. No. 4,008,994, issued Feb. 22, 1977.

It has long been recognized that the yields obtained from regeneration of carbon that has been utilized in potable water purification are often significantly lower than yields obtained during regeneration of carbon that has been employed to remove high concentration organic materials such as is found in waste water. A typical regeneration process where the carbon has been utilized in potable water purification will result in the loss of utlizable carbon of anywhere from ten to twenty percent (by weight). This compares with losses of approximately two to ten percent when the regenerated carbon has been employed to remove high concentration organic compounds from waste water.

It has been hypothesized that the lower yields associated with the regeneration of activated carbon employed in potable water purification are attributable to mineral deposits formed on the carbon which are insoluable and interfere with the reactions which occur at the high temperatures normally associated with carbon regeneration.

Although the exact mechanism and chemical reactions are not fully understood, it is believed that the lower yields associated with the regeneration of activated carbon from potable water purification processes are attributable to the following reactions:

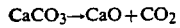  A.

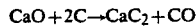  B.

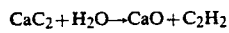  C.

Manifestly, the calcium oxide from reactions A and C continually supplies an almost endless source of reactant for reaction B which already has a limitless source of carbon from the product being regenerated. Thus, it is believed that the presence of calcium or other alkaline metal continually reacts with the carbon during the regeneration process thus decreasing yields. It should be noted that reaction C normally occurs at temperatures approaching 2000 degrees C. or above, but apparently the presence of carbon in the activated form acts to lower the reaction temperatures close to those normally encountered in carbon regeneration.

We have found that the treatment of activated carbon from water purification applications by an acid wash prior to carrying out the normal regeneration process significantly improves yields and provides results which are comparable to those obtained in the regeneration of spent carbon from waste water applications. Various inorganic acids may be utilized such as hydrochloric, sulfuric, sulfonic, nitrous, or nitric, with acids forming soluble salts preferred and HCl acid being most preferred. The reaction which is believed to take place is as follows:

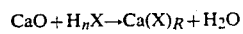  D.

n = 1 or 2

X = inorganic acid group

R = 1 or 2

The calcium salt which is formed during reaction D is variably water soluble and can be removed by rinsing with water prior to carrying out the usual steps of a carbon regeneration process.

It is believed that the process of the present invention has applicability to the removal of any alkaline earth metal from spent activated carbon. It is particularly applicable to the removal of calcium and magnesium, especially calcium which is the most common detrimental inorganic that is encountered in spent carbon from potable water purification processes.

In broadest form, the method of the present invention involves washing the activated carbon with an inorganic acid and rinsing the acid washed carbon with water. Preferably, the washing step is carried out for three to thirty minutes while maintaining a pH of 2.5 or less. The actual washing time will vary depending upon the source and extent of contamination as well as the specifications for the regenerated product. The rinsing step is preferably carried out until the pH has risen to 5 or greater for a time approximately equal to the time spent in the washing step.

Manifestly, the procedure of the present invention as set forth above may be combined with state of the art regeneration procedures to provide a method of regenerating spent activated carbon which comprises in broadest form the steps of washing the carbon to be generated with an inorganic acid, rinsing the acid washed carbon with water, separating the washed carbon from the rinse water, and drying the washed and rinsed carbon to remove the remaining water. The drying will be at a temperature of 100 degrees C. to 500 degrees C. for a period of one-tenth to twenty-four hours. Next, the temperature of the dried carbon is raised to a level between about 500 degrees C. to 1100 degrees C. while introducing water vapor so as to effect the water gas reaction, namely,

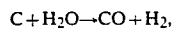

followed by quenching or cooling the regenerated carbon. This process is normally carried out in conventional carbon regeneration equipment which includes a vessel for drying the cooled carbon and means for introducing the dried carbon into a pyrolizing vessel where the temperature is raised by a heat source to effect the water gas reaction. The most preferred regeneration method according to the present invention includes the steps set forth above with the washing step being carried out for three to ten minutes while a pH of 2.5 or less is maintained and the rinsing step is carried out until the pH has risen to 5 or greater for a period of three to thirty minutes.

In the reactions A-D previously set forth, calcium has been used as the reacting inorganic contaminant and HCl as the mineral acid although it is to be understood that other minerals such as magnesium are sometimes encountered as a contaminant in activated carbon and the invention has applicability to the other alkaline earth metals as well. Likewise, other inorganic acids such as sulfuric and nitric may be substituted for HCl.

The following example is indicative of the procedure encompassed by the present invention:

EXAMPLE

Spent granules of activated carbon from a potable water purification process were utilized. Calcium, in the form of $CaCO_3$ was present in a quantity of 5900 parts per million (PPM) (actual calcium content). The spent carbon was dried at approximately 105 degrees C. for approximately 24 hours and the dried product designated Sample I.

A portion of Sample I was acid washed with diluted HCl for approximately five minutes to pH 0.5. The acid washed carbon was then rinsed with tap water to a pH of about 5.0 followed by rinsing with distilled water. Total rinse time was approximately five minutes. The washed and rinsed product was designated Sample II. Analysis showed the calcium content of Sample II to be 1800 PPM.

Another portion of Sample I was treated in the same manner except the wash time was increased to 30 minutes, rinse time was increased to about seven minutes and drying at 105 degrees C. was carried out for 24 hours. The washed and dried product was designated Sample III. When analyzed, Sample III was found to have a calcium content of 65 PPM.

A portion of Sample III was treated with a CaOH slurry (7000 PPM Ca) to reintroduce calcium onto the carbon and then dried and designated Sample IV. The calcium content of Sample IV was 4100 PPM. Each of samples I, II, III and IV was then treated with regeneration gas for twenty minutes at 820–840 degrees C. Each sample was then similarly water washed, filtered and dried. The weight losses from the respective samples were:

| Sample | $Ca^{++}$ PPM | % Loss |
|---|---|---|
| I | 5900 | 13.2 |

| Sample | $Ca^{++}$ PPM | % Loss |
|---|---|---|
| II | 1800 | 9.6 |
| III | 65 | 7.2 |
| IV | 4100 | 12.0 |

These results further substantiate the effectiveness of the present invention.

Having thus described the invention, we claim:

1. A method of regenerating calcium contaminated spent activated carbon which has been used in water purification, said method being characterized by reducing carbon loss and comprising the steps of:
    washing the carbon to be regenerated with an inorganic acid to remove calcium;
    terminating said washing step prior to carbon regeneration;
    rinsing the acid washed carbon with water to obtain a pH of about 5 or greater;
    separating the washed carbon from the rinse water;
    drying the washed and rinsed carbon to remove any remaining water;
    raising the temperature of the dried carbon to about 500 degrees C. to 1100 degrees C. while introducing water vapor so as to effect the reaction:

$$C + H_2O \rightarrow CO + H_2;$$

and
    removing the regenerated carbon.

2. A method as set forth in claim 1, wherein said washing step comprises washing for 3 to 30 minutes while maintaining a pH of 2.5 or less.

3. A method as set forth in claim 1, wherein said acid is a member of the group consisting of $HNO_3$ and HCL.

4. A method as set forth in claim 3, wherein said acid is HCl.

5. A method of regenerating calcium contaminated spent activated carbon which has been used in water purification, said method being characterized by reducing carbon loss said method comprising:
    washing the carbon to be regenerated with HCl to obtain a pH of 2.5 or less for a period of at least three minutes,
    terminating said washing step prior to carbon regeneration;
    rinsing the washed carbon with water to obtain a pH of 5 or greater for at least three minutes,
    separating the washed carbon from the rinse water;
    drying the washed and rinsed carbon to remove any remaining water;
    raising the temperature of the dried carbon to about 500 degrees C. to 1100 degrees C. while introducing water vapor so as to effect the reaction:

$$C + H_2O \rightarrow CO + H_2;$$ and removing the regenerated carbon.

* * * * *